United States Patent
Suzuki et al.

[15] 3,641,493
[45] Feb. 8, 1972

[54] COMBINATION TURN-SIGNAL AND HAZARD-WARNING SIGNAL SYSTEM

[72] Inventors: Masaru Suzuki, Hekikai-gun, Aichi; Masayoshi Hyodo, Toyota, Aichi, both of Japan

[73] Assignee: Kabushiki Kaisha Tokai Rika Denki Seisakusho, Nishibiwajma-cho, Nishikasu-gai-gun, Aichi Prefecture, Japan

[22] Filed: Apr. 23, 1969

[21] Appl. No.: 818,537

[30] Foreign Application Priority Data

Apr. 29, 1968 Japan..................................43/28727
June 20, 1968 Japan..................................43/52377

[52] U.S. Cl..............................340/81 F, 200/4, 200/61.27, 340/67
[51] Int. Cl..........................................................B60q 1/38
[58] Field of Search......................340/52, 55, 67, 73, 79–83

[56] References Cited

UNITED STATES PATENTS

| | | |
|---|---|---|
| 2,654,079 | 9/1953 | Ringwald..................................340/81 |
| 2,771,525 | 11/1956 | Sivak..................................340/81 F X |
| 2,812,396 | 11/1957 | Hollins..................................200/61.35 |
| 3,114,015 | 12/1963 | Magazanik..................................200/61.27 |
| 3,308,427 | 3/1967 | Hess..................................340/81 X |
| 2,469,233 | 9/1969 | Havlicek et al..................................340/81 F |
| 3,510,839 | 5/1970 | Elliott et al..................................340/81 |

Primary Examiner—John W. Caldwell
Assistant Examiner—Kenneth N. Leimer
Attorney—Woodhams, Blanchard and Flynn

[57] ABSTRACT

A combination turn signal and hazard-warning-signal system having movable contact means disposed for coaction with stationery contact means to permit energization of the right and left vehicle indicator lights. The movable contact means is mounted within a casing which is displacable in response to movement of a turn signal control lever for permitting energization of either the right or left indicator lights. The casing is also manually movable to a position wherein the movable contact means engages the fixed contact means irrespective of the position of the control lever for causing simultaneous flashing of both the right and left indicator lights.

10 Claims, 10 Drawing Figures

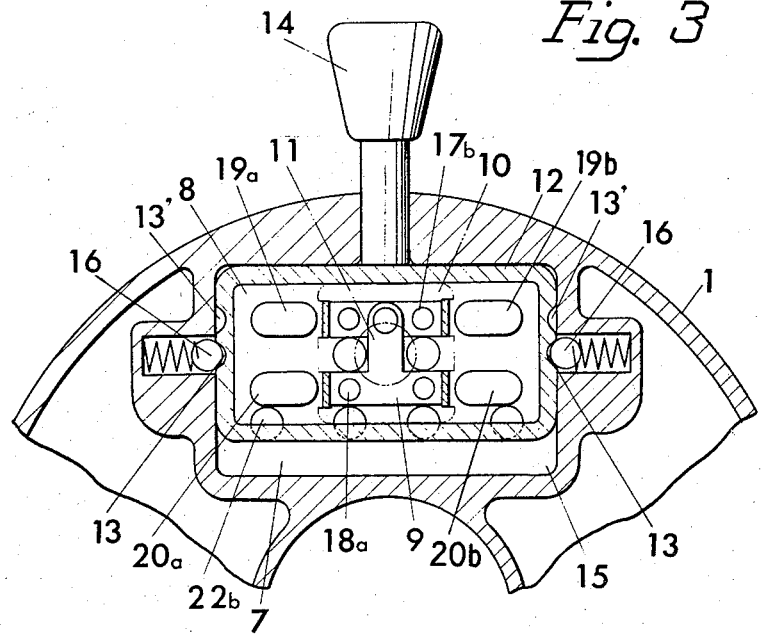
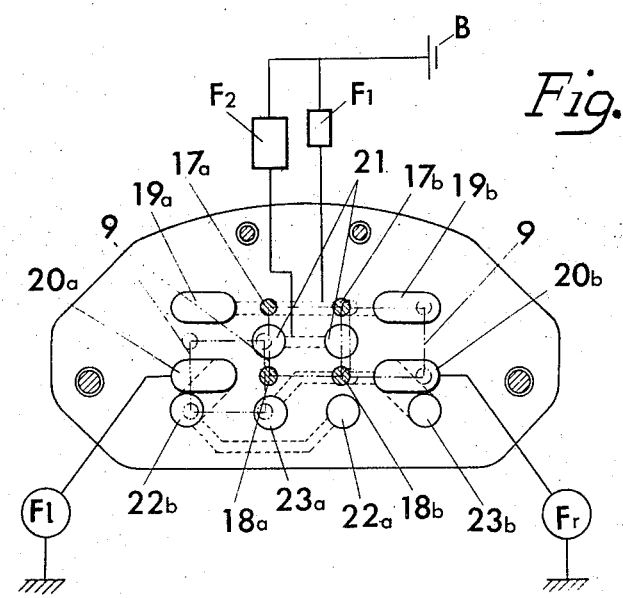

INVENTORS
MASARU SUZUKI
MASAYOSHI HYODO

BY Woodhams, Blanchard & Flynn
ATTORNEYS

COMBINATION TURN-SIGNAL AND HAZARD-WARNING SIGNAL SYSTEM

This invention relates to a combination turn signal and hazard-warning-signal system for causing energization of the right and left vehicle indicator lights. This invention includes a switch which has movable contact means which are movably controlled by a turn signal control lever to permit flashing of the right or left indicator lights when the control lever is displaced from a neutral position and the movable contact means is disposed in a winking position. The movable contact means can also be manually moved to a warning position whereby it causes simultaneous energization of both the right and left indicator lights irrespective of the position of the turn signal control lever.

It is thus a main object of the present invention to provide a system which possesses the above desirable modes of operation and which can be easily converted to function as either a winker or a warning switch merely by moving the movable contact means in a direction substantially transverse to the movement thereof by the turn signal control lever.

These and other objects of the invention will be apparent upon studying the following specification and in inspecting the accompanying drawings, wherein:

FIG. 3 is a plan view taken on III—III in FIG. 2;

FIG. 4 is a plan view of fixed contacts group and of contact;

Figure 1:
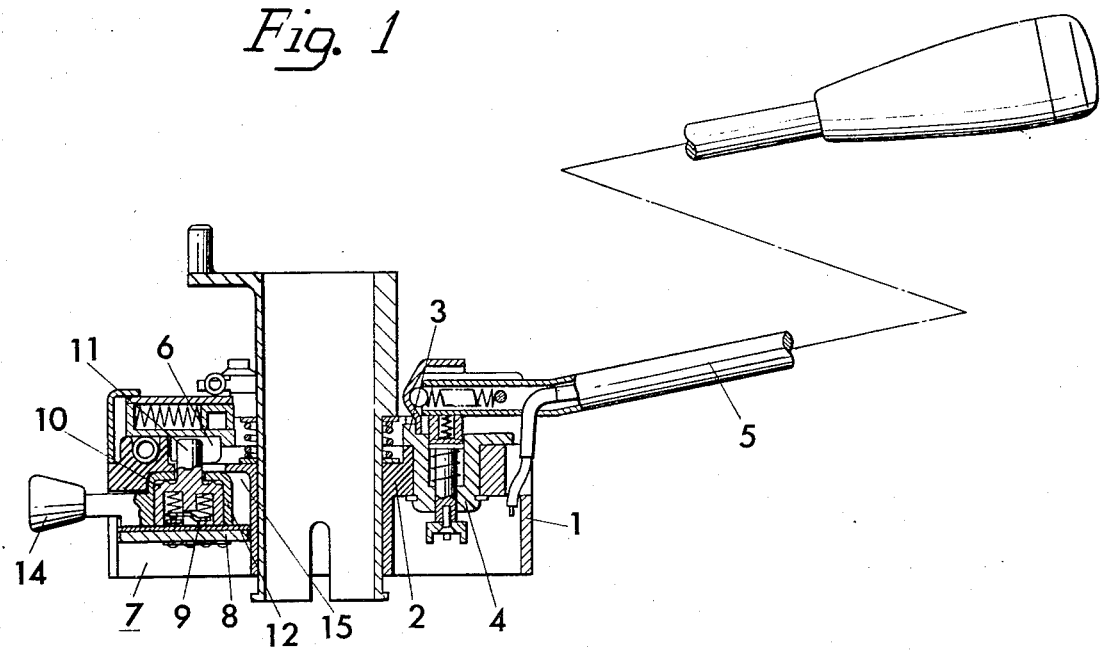
FIG. 1 is a vertical section side view.
Figure 2:
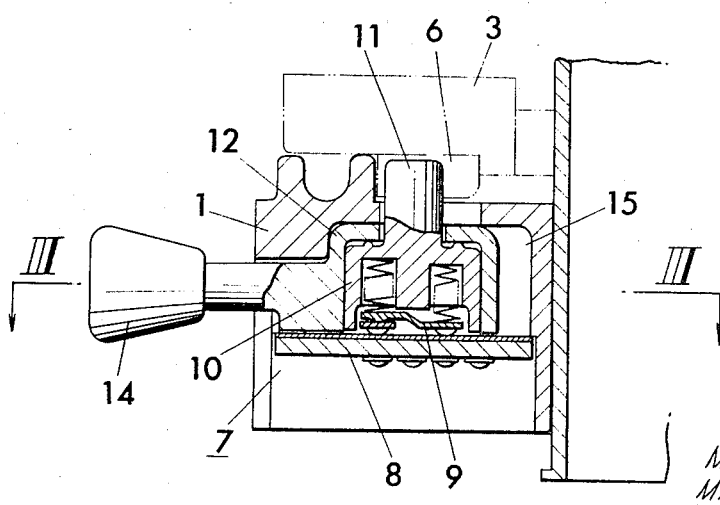
FIG. 2 is an expanded vertical section side view of an important part.

Referring now to the first embodiment of this invention illustrated in FIG. 1 through FIG. 4, there is a winker switch case 1 fixed around a steering shaft and having a bottom wall 2 provided with an annular switch operating bracket 3 supported by a tube 4. From the said bracket 3 projects a turn signal lever 5. A long sliding groove 6 is formed on the lower face of the said bracket and extends lengthwise of the lever 5. A winker switch 7 is mounted within the case 1 and includes a fixed contact plate 8, a movable conductive contact member 9 and a holder 10 for the said movable contact member 9. The holder 10 has a projection 11 extending into the sliding groove 6. The holder 10 is usually maintained in a center neutral position in connection with the lever 5 when it is at the neutral position. If lever 5 moves to the left-hand side, which causes bracket 3 to angularly shift about the axis of tube 4, the holder moves to the left direction substantially at right angles with the sliding groove 6. When the lever 5 is moved from neutral to the right-hand side, which causes bracket 3 to angularly shift in the opposite direction, the holder 10 is made to move to the right direction. For the purpose of guiding the above movements, the holder 10 is held in a holding case 12 which permits the holder 10 to move only transverse to the elongated direction of the slot 6. The holding case 12 is positioned within a cavity 15 provided at the lower face on the bottom wall 2 of the winker switch case 1. Cavity 15 permits case 12 to move solely in a direction which is at a right angle to the movement direction of the holder 10. A pair of click balls 16 are provided in the case 1 on opposite sides of the case 12. The balls 16 are projected by spring elasticity from both sides of the said cavity 15, and the click balls 16 are adapted to be positioned within either of two interconnection holes 13, 13′ formed on both sides of the holding case 12 for permitting case 12 to be releasably held in two different positions. 14 is a knob projecting from the holding case 12 to the outside of the switch case 1. The fixed contact plate 8 covers the opened lower face of the said cavity 15.

The movable contact member 9 has two rows with two contacts 17a, 17b and 18a, 18b respectively. The fixed contact plate 8, when holding case 12 is in its outer position and is fixed by the interconnection of ball 16 with hole 13, has a contact 19a disposed for engagement with the contact 17a upon left movement of holder 10 and a contact 19b disposed for engagement with the contact 17b upon right movement of holder 10. In a similar manner, plate 8 has a contact 20a disposed for engagement with the contact 18a upon left movement of holder 10 and a contact 20b disposed for engagement with the contact 18b upon right movement of holder 10. The said contacts 19a, 19b are connected to a power supply B through a flasher $F_1$ and the contact 20a is connected to a left direction indicator lamp $F_l$ and the contact 20b to a right direction indicator lamp $F_r$, respectively.

The holding case 12 is moved by a half of the distance between the rows of contacts 17a, 17b and 18a, 18b by pressing the knob 14, thus causing the click ball 16 to disengage hole 13 and engage hole 13′. This thus places the case 12 in an inner position whereby contact member 9 can then coact with contacts 21a, 21b, 22a, 22b, 23a and 23b as provided on the contact plate 8. When holder 10 is in the neutral position the row of contacts 17a, 17b engage the flasher contacts 21a and 21b and the contacts 18a, 18b engage the contacts 22a and 23a. When holder 10 is moved to the left, contact 17b engages contact 21a and contacts 18a, 18b respectively engage contacts 22b, 23a. When holder 10 moves to the right the contact 17a engages contact 21b, and contacts 18a, 18b respectively engage contacts 22a, 23b. The indicating contacts 21a, 21b are connected through a flasher $F_2$ to the power supply B, and the indicating contacts 22a, 22b are connected to the contact 20a through a connection line at the backface of plate, and the indicating contacts 23a, 23b are connected to the contact 20b through a similar connection line.

In operation of this embodiment, usually the holding case 12 is located in its outer position as shown in FIG. 3 so that the ball 16 is disposed with hold 13. In this position, the movable contact member 9 and the holder 10 are interlocked for right and left movements corresponding to the movements of the turn signal lever 5, whereby giving the function of a flasher switch for turning on and off one of the left and right direction-indicating lamps $F_l$, $F_r$. However, if the holding case 12 is moved by the knob 14 into the inner position so that ball 16 engages hole 13′, and whether the movable contact member 9 and the holder 10 are at the neutral position or at either right or left moving position, both or either of the contacts 17a, 17b engage at least one of the contacts 21a and 21b. Further, the contacts 18a, 18b contact respectively two of the corresponding indicating contacts 22a, 22b and 23a, 23b, and the right and left direction-indicating lamps $F_l$, $F_r$ are simultaneously turned on and off through the contacts 20a, 20b. Thus, when holder 12 is in its inner position, both lamps $F_l$, $F_r$ will flash irrespective of the position of the holder 10 and lever 5.

The device of this invention, as shown clearly in the embodiment above, contains the movable contact of the winker switch and its holder in the holding case keeping them movable by interlocking the turn-signal lever, moves the case together with the movable contact to the direction crossing the said movement direction, that is, the direction transverse to said movement direction, on the fixed contact plate to deprive the switch function as a winker switch, and simultaneously controls emergency flashing indication correctly by flashing the right and left direction-indicating lamps immediately after the movement to the crossing direction is conducted in connection with the holding case of the said contact even if the movable contact is at the neutral position where the right and left direction-indicating lamps do not flash or at the movable position where the right or left direction-indicating lamp flashes, so it is free from care of missing emergency flashing indication even by forgetting to return the control lever, and has merits that the change from the winker switch function to the emergency flashing indication function is instantly conducted by the near winker switch and that such as rear collisions to this car in parking can be prevented by the easiest operation of this device.

Figure 5:
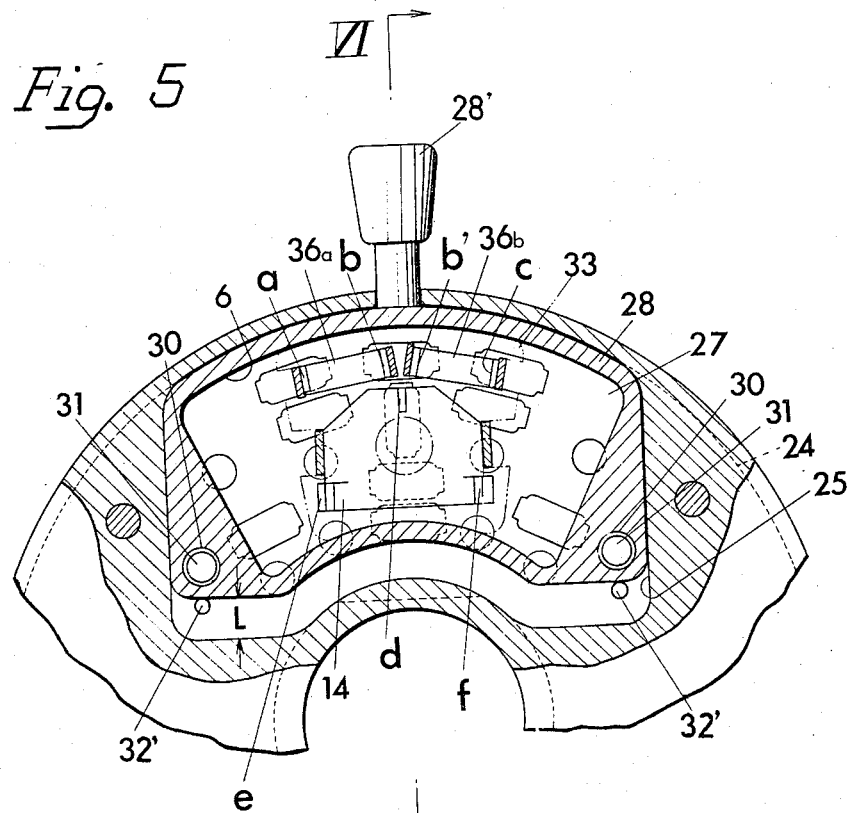
FIG. 5 is a plan view of a part of another embodiment of this invention, taken on line V—V in FIG. 6, showing a contact holder by the dotted line.
Figure 6:
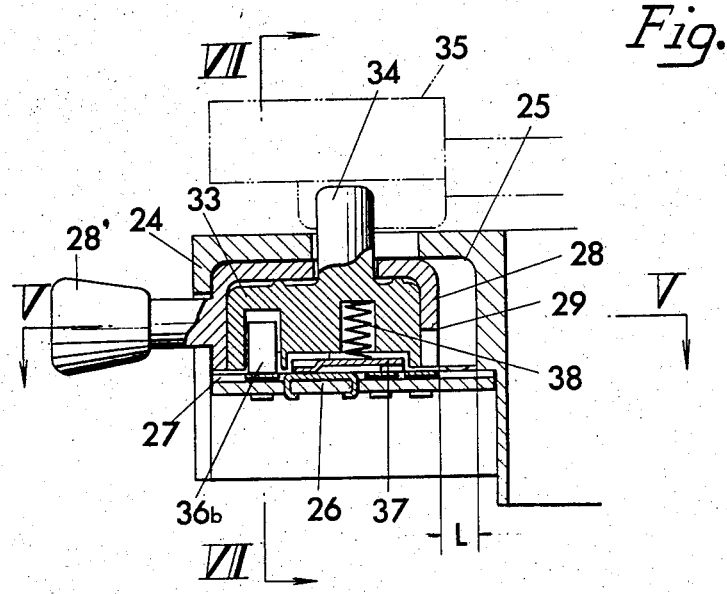
FIG. 6 is a side view taken on line VI—VI in FIG. 5.
Figure 7:
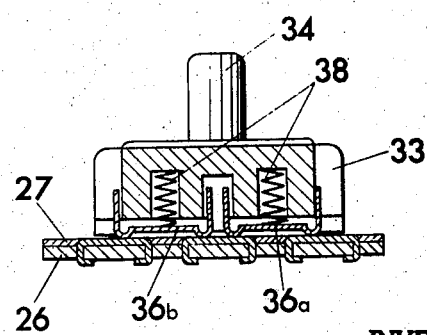
FIG. 7 is a section view taken on line VII—VII in FIG. 6.

Referring now to FIG. 5 through FIG. 10 showing aspects of another embodiment of this invention, 24 is a direction indicator body which has at one place of its backface a clearance 25 for fixing a switch shown in FIG. 5 and FIG. 7 and has at the open bottom face an insulator 26 and a subinsulator 27 fixed one over the other as shown in FIG. 6 and has in the clearance 25 a box 28 with the open lower face containing a contact holder 33 to move freely from the neutral position to the right and left directions in FIG. 5. The said box 28 is freely movable back and forth within a limit of gap L in the clearance 25, and a spring and an interconnection ball 31 are positioned in a blind hole 30 formed from the lower face of the said box 28, and the said interconnection ball 31 is adapted to engage either of holes 32, 32' provided one after the other in the subinsulator 27 so that box 28 can temporarily be fixed at two different positions. The contact holder 33 has a circular arc-type movement, so a fan-type guiding groove 29 is formed in the box 28 as shown in FIG. 5, and a pin 34 on the upper face of the contact holder 33 is projected through the sliding groove on the top of the box 28 and the clearance 25 to the upper part, and is inserted to a direction indicator bracket 35 movable to the right and left from the neutral position on the said body 24.

Figure 8:
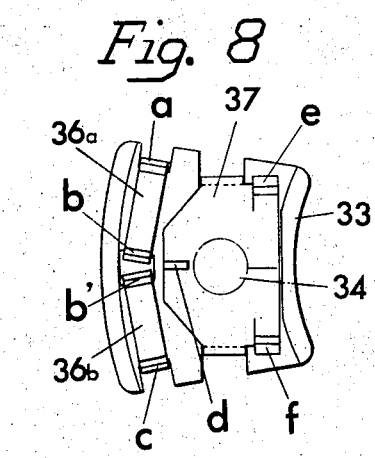
FIG. 8 is a bottom view of a contact holder.

At the lower face of the contact holder 33 are provided two rows of contact members as shown in FIG. 8, on the front row of which are fixed two contact plates 36a, 36b for the right and left and on the right and left ends are provided contact projections a, b, b', c. The contact projections b, b' are provided adjacent to each other and generally operate uniformly. On the back row is fixed a contact plate 37 formed substantially as an equilateral triangle with three contact projections d, e, f respectively at the center of the front end and on both sides of the rear end. To the plates 36a, 36b, 37 are respectively added contact pressure springs 38 (some parts are excluded from figures).

Figure 9:
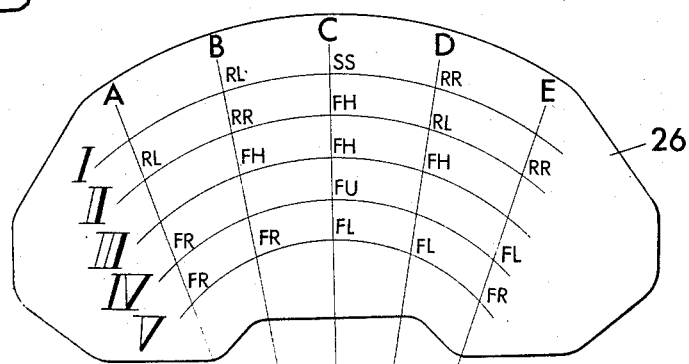
FIG. 9 is a schematic view of the locations of fixed contacts on an insulator.

FIG. 9 shows the contact dispositions on the insulator 26 and a standard for disposing contacts is fixed to the crossings of five rows of concentric circular arc I-V in parallel with the movement direction of the contact holder 33 and of lines A-E extending from the center of the said circular arc to the radiant direction. The distance between the circular arc rows I-V is consistent with a moving distance L of box 28, and the distance between the lines A-E is consistent with a moving distance of contact holder 33 from the neutral position to the right or left position, and the center line C is duly conformed with the moving direction of box 28. The first and the second rows I, II correspond to the contact projections a, b, b', c of contact plates 36a, 36b, the second and the third rows II, III to the contact projection d of contact plate 37 and the fourth and the fifth rows IV, V to the contact projections e, f of plate 37. The contacts disposed on the insulator 26 are of seven kinds such as a stop lamp contact SS, rear right lamp contact RR, rear left lamp contact RL, front right lamp contact FR, front left lamp contact FL, winker battery contact FU, and hazard battery contact FH, and many of them are duplicate.

The first row I of a circular arc forms a row of stop lamp control contacts and has a contact SS at the crossing of line C, a contact RL at the crossing of line B and a contact RR at the crossing of line D.

The second row II is mixed with a winker contact row and a hazard warning contact row and has a contact FH at the crossing of line C, contacts RR at the crossings of lines B,E and contacts RL at the crossings of lines D,A.

The third row forms a contact row for exclusive use of hazard battery for front lamps, and has contacts FH at the crossings of lines C, B, D.

The fourth row IV forms a winker switch contact row in cooperation with some contacts on the second row and has a contact FU at the crossing of line C, a contact FR at the crossing of line A and a contact FL at the crossing of line E.

The fifth row V forms a contact row for exclusive use of front hazard warning in cooperation with each contact on the third row and has contacts FL at the crossings of lines C, D and contacts FR at the crossings of lines A, B, E.

Figure 10:
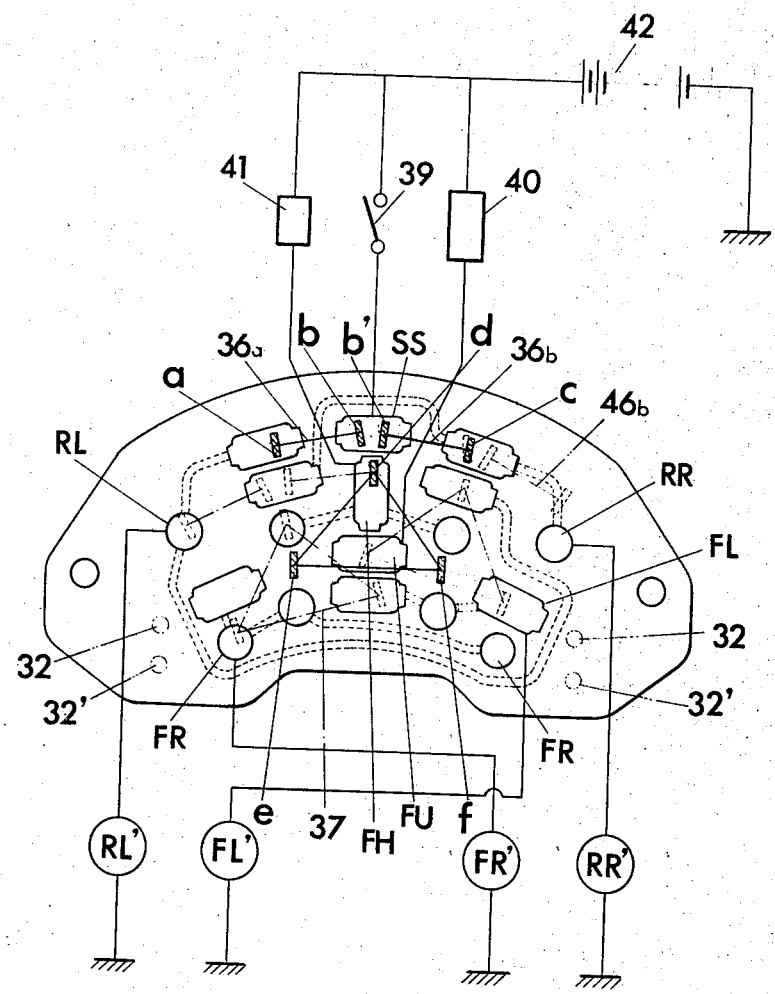
FIG. 10 is a schematic view of the operation of this embodiment.

The similar contacts to those said above are connected to each other according to print wirings (see FIG. 10) on the lower face of insulator 26, the contact SS is connected through a stop switch 39 to a power supply 42, the contact FU is connected through a flasher or winker unit 40 to the power supply 42, the contact FH is connected through a hazard winker unit 41 to the power supply 42, and the contact RR is connected to a rear right lamp RR', the contact RL to a rear left lamp RL', the contact FR to a front right lamp FR' and the contact FL to a front left lamp FL' respectively as shown in FIG. 10.

The subinsulator 27 has a thickness consistent with the height of each of said contacts and thrusts the said contacts into the open hole of said insulator 27 to smooth the sliding face of each contact projections a-f of the contact plate 33.

The combination switch of this invention is provided with a construction in which by fixing temporarily the box 28 to the forwarding position shown in FIG. 5 after pulling the knob 28', the contact projections a, b, b', c of said contact plates 36a, 36b move on the contact row I on the insulator 26, the contact projection d of the contact plate 37 moves on the contact row II, and the contact projections e, f move on the contact row IV to cause the winker or turn signal switch operation to operate simultaneously with a conventional stop circuit. By pushing the box 28 inwardly in FIG. 5, the contact projections a, b, b', c of contact plates 26a, 26b move on the contact row II on the insulator 26, the contact projection d of contact plate 37 moves on the contact row III and the contact projections e, f, move on the contact row V, and whether the contact holder 33 is at the neutral position or at either left or right movement position, it always contacts a hazard battery contact FU or FH and four lamp contacts RR, FL, FR, RL in the front and rear and the right and left to turn on and off all lamp. Accordingly, the hazard warning switch function is correctly conducted, and the combination function of said both switches can effectively be maintained without causing any interference to each other.

What is claimed is:

1. A combined turn signal and hazard-warning-signal system for a vehicle having right and left indicator lights, comprising:
    stationary housing means;
    a turn signal control member movably mounted on said housing means, said control member being normally maintained in a neutral position and being movable into first and second control positions disposed on substantially opposite sides of said neutral position;
    casing means mounted on said housing means for movement in a first direction between a turn signal position and a hazard-warning position;
    movable contact means movably mounted on said casing means for movement in a second direction substantially transverse to said first direction, said movable contact means being movable relative to said casing means along said second direction between first and second actuating positions which are disposed on substantially opposite sides of a central position;
    connecting means coacting between said turn signal control member and said movable contact means for causing movement of said movable contact means in said second direction from said central position into said first or second actuating position in response to movement of said turn signal control member from said neutral position into said first or second control position, respectively;
    stationary contact means mounted on said housing means and disposed for coaction with said movable contact means for controlling energization of the right and left indicator lights;

first circuitry means for permitting flashing of a selected one of said right and left indicator lights, said first circuitry means including cooperating contacts on said movable and stationary contact means for causing energization and flashing of only said right indicator light when said movable contact means is in said first actuating position and said casing means is in said turn signal position, said first circuitry means also including cooperating contacts on said movable and stationary contact means for causing energization and flashing of only said left indicator light when said movable contact means is in said second actuating position and said casing means is in said turn signal position;

second circuitry means connected to both said right and left indicator lights for permitting flashing of both said right and left indicator lights when said casing means is in said hazard-warning position, said second circuitry means including further contacts coacting between said movable and stationary contact means causing energization and flashing of both said right and left indicator lights irrespective of the position of said movable contact means relative to said casing means.

2. A system according to claim 1, wherein one of said contact means has first and second substantially parallel rows of contacts thereon extending substantially parallel to said second direction, and the other contact means having third and fourth substantially parallel rows of contacts thereon disposed for engagement with the contacts of said first and second rows respectively, when the casing means is in said turn signal position;

said other contact means also having fifth and sixth rows of contacts thereon disposed substantially parallel with said first and second rows and being disposed for coaction with said first and second rows, respectively, when said casing means is in said hazard-warning position, the transverse spacing between said first and second rows, between said third and fourth rows, and between said fifth and sixth rows being substantially the same.

3. A system according to claim 2, wherein said fifth row is disposed between said third and fourth rows, and wherein said fourth row is disposed between said fifth and sixth rows.

4. A system according to claim 2, wherein said first and second rows of contacts are formed on said movable contact means, and wherein said third, fourth, fifth and sixth rows of contacts are formed on said stationary contact means.

5. A system according to claim 1, wherein said housing means includes slot means for slideably guiding said casing means in said first direction, and detent means coacting between said housing means and said casing means for releasably holding said casing means in either said turn signal or hazard-warning position.

6. A system according to claim 5, wherein said connecting means includes a pin-and-slot connection coacting between said turn signal control member and said movable contact means, said slot being elongated in a direction substantially parallel to said first direction.

7. A system according to claim 6, wherein said casing means has an elongated recess formed therein and extending substantially in said second direction, said movable contact means being slideably disposed in said recess for movement in said second direction.

8. A system according to claim 5, wherein said casing means includes a manually engageable knob fixedly secured thereto and slideably extending outwardly from said housing means for enabling said casing means to be manually moved between said turn signal and said hazard-wardning position by means of a pushing or pulling movement.

9. A system according to claim 1, wherein said movable contact means has three substantially parallel rows of contacts thereon, and wherein said stationary contact means has five substantially parallel rows of contacts disposed thereon.

10. A system according to claim 1, wherein said movable contact means includes three conductive elements with two of said conductive elements each having two spaced contact projections thereon, the contact projections of said two conductive elements being disposed in a row, and said third conductive element having three contact projections thereon disposed in a triangular arrangement with the contact projection representing the apex of said triangular arrangement being disposed closely adjacent said row of contacts, and said stationary contact means having five substantially parallel rows of contacts formed thereon with said rows on said stationary contact means extending substantially parallel to the rows on said movable contact means, the contact projections on the movable contact means being disposed for coaction with the contacts of the first, second and fourth rows of the stationary contact means when the casing means is in the turn signal position, and the contact projections of the movable contact means being disposed for coaction with the contacts of the second, fourth and fifth rows of the stationary contact means when the casing means is in the hazard-warning position.

* * * * *